(12) United States Patent
Huch et al.

(10) Patent No.: US 11,760,692 B2
(45) Date of Patent: Sep. 19, 2023

(54) SETTING TYPE JOINT COMPOUND COMPOSITIONS WITH REDUCED PLASTER

(71) Applicant: United States Gypsum Company, Chicago, IL (US)

(72) Inventors: Christian Huch, Gurnee, IL (US); Alexander J. Donovan, Lake Forest, IL (US); Jeffrey F. Grussing, Trevor, WI (US); Naveen Punati, Lake Zurich, IL (US); Pamela L. Hargrove, Cary, IL (US); Joseph W. Schlude, Vernon Hills, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 327 days.

(21) Appl. No.: 17/146,940

(22) Filed: Jan. 12, 2021

(65) Prior Publication Data

US 2021/0230067 A1 Jul. 29, 2021

Related U.S. Application Data

(60) Provisional application No. 62/966,872, filed on Jan. 28, 2020.

(51) Int. Cl.
| | |
|---|---|
| *C04B 28/14* | (2006.01) |
| *C04B 14/28* | (2006.01) |
| *C04B 14/10* | (2006.01) |
| *C04B 24/38* | (2006.01) |
| *C04B 111/00* | (2006.01) |
| *C04B 103/44* | (2006.01) |
| *C04B 103/22* | (2006.01) |
| *C04B 103/12* | (2006.01) |

(52) U.S. Cl.
CPC ............ *C04B 28/14* (2013.01); *C04B 14/102* (2013.01); *C04B 14/28* (2013.01); *C04B 24/383* (2013.01); *C04B 2103/12* (2013.01); *C04B 2103/22* (2013.01); *C04B 2103/44* (2013.01); *C04B 2111/00689* (2013.01)

(58) Field of Classification Search
None
See application file for complete search history.

(56) References Cited

U.S. PATENT DOCUMENTS

| | | |
|---|---|---|
| 3,297,601 A | 1/1967 | Maynard et al. |
| 4,454,267 A | 6/1984 | Williams |
| 4,525,388 A | 6/1985 | Rehder et al. |
| 5,746,822 A | 5/1998 | Espinoza et al. |
| 5,779,786 A | 7/1998 | Patel |

(Continued)

FOREIGN PATENT DOCUMENTS

GB 2048235 A 12/1980

OTHER PUBLICATIONS

Winter C., et al., "Die europaische Trockenmortelindustrie (Teil 1)", The European Dry-Mix Mortar Industry, Jun. 1, 2007, pp. 62-69, vol. 60, No. 6.

*Primary Examiner* — John J Figueroa
(74) *Attorney, Agent, or Firm* — Greer, Burns & Crain, Ltd; Philip T. Petti; Pradip Sahu

(57) ABSTRACT

A snap-setting joint compound with reduced calcium sulfate hemihydrate and improved sandability, as well as methods for building wall assemblies and repairing walls with the joint compound.

10 Claims, 5 Drawing Sheets

(56) References Cited

U.S. PATENT DOCUMENTS

| | | | |
|---|---|---|---|
| 6,566,434 B1* | 5/2003 | Mayer | C08F 236/10 |
| | | | 524/425 |
| 7,754,007 B2 | 7/2010 | Lettkeman et al. | |
| 8,931,230 B2 | 1/2015 | Negri et al. | |
| 10,941,074 B2* | 3/2021 | Bouteiller | E04C 2/043 |
| 2006/0048684 A1 | 3/2006 | Bonetto et al. | |
| 2017/0241881 A1 | 8/2017 | Pelot et al. | |
| 2018/0354852 A1* | 12/2018 | Weinberger | C08B 31/063 |

\* cited by examiner

| Test Performed<br>(24 Hours After Application) | Sample Number | | | | | |
|---|---|---|---|---|---|---|
| | 1566A<br>(Control) | 1566B<br>(Trial 1) | 1566C<br>(Trial 2) | 1566D<br>(Trial 3) | 1566E<br>(Trial 4) | 1566F<br>(Trial 5) |
| Percent Tape Fiber Remaining for each of 3 X-cuts Taken to test Adhesion to paper tape at 95°F (35°C) / 10% RH | 95%, 99%, 99% | 95%, 99%, 99% | 95%, 99%, 95% | 99%, 99%, 90% | 95%, 99%, 99% | 95%, 90%, 95% |
| Percent Tape Fiber Remaining for each of 3 X-cuts Taken to test Adhesion to paper tape at 75°F (24°C) / 50% RH | 99%, 99%, 95% | 99%, 95%, 99% | 72%, 72%, 56% | 95%, 95%, 99% | 36%, 36%, 20% | 99%, 99%, 99% |
| Percent Tape Fiber Remaining for each of 3 X-cuts Taken to test Adhesion to paper tape at 40°F (4°C) / 80% RH | 99%, 99%, 99% | 95%, 99%, 99% | 56%, 72%, 20% | 99%, 99%, 95% | 56%, 72%, 56% | 99%, 95%, 99% |
| 1/8" Fill Crack Panel (95°F/10% RH) | 0 | 0 | 0 | 0 | 0 | 0 |
| Shrinkage, volume % | 11.25% | 13.20% | 12.47% | 9.05% | 12.47% | 5.62% |

FIG 2

| Test Performed (24 Hours After Application) | Sample Number | | | | | |
|---|---|---|---|---|---|---|
| | 1566A (Control) | 1566B (Trial 1) | 1566C (Trial 2) | 1566D (Trial 3) | 1566E (Trial 4) | 1566F (Trial 5) |
| Durometer (100= gypsum drywall) | >99 | 96 | 97 | 97 | 97 | 98 |
| Notes From Individual Who Mixed the Sample: | moderate mixing, graininess, similar consistency in general | easy mix; more lumps; similar consistency in general | easy mix, similar consistency in general, less lumps during mixing | easy mix, takes a little more water than 1566F | easy mix, really creamy | good mix |
| 2" Cube Dry density (PCF) | | | | | | |
| Sample 1 | 51.72 | 50.55 | 48.96 | 52.25 | 48.32 | 52.79 |
| Sample 2 | 51.24 | 50.48 | 48.73 | 52.61 | 48.55 | 52.69 |
| Sample 3 | 51.07 | 50.12 | - | 52.13 | - | 52.87 |
| Average | 51.34 | 50.38 | 48.85 | 52.33 | 48.44 | 52.78 |
| 2" Cube Compressive Strength (psi) | | | | | | |
| Sample 1 | 1518.42 | 1159.29 | 846.26 | 1306.25 | 874.85 | 1365.4 |
| Sample 2 | 1238.38 | 1201.51 | 854.07 | 1340.04 | 888.41 | 1512.04 |
| Sample 3 | 1366.99 | 1198.06 | | 1361.62 | | 1561.68 |
| Average | 1374.6 | 1186.29 | 850.17 | 1335.97 | 881.63 | 1479.71 |

FIG 3

$$\Delta E = \sqrt{(L^*_1 - L^*_2)^2 + (a^*_1 - a^*_2)^2 + (b^*_1 - b^*_2)^2}$$

FIG 4

SETTING TYPE JOINT COMPOUND COMPOSITIONS WITH REDUCED PLASTER

TECHNICAL FIELD

The present disclosure relates to materials, products and methods for the construction industry, including a setting-type joint compound. The present disclosure also relates, but is not limited, to methods for finishing and/or repairing wall surfaces as well as to methods for constructing a wall assembly, including methods for finishing joints between two adjacent wall panels.

BACKGROUND

Walls, partitions, and ceilings are typically assembled by attaching panels one by one to a frame, known as studs or joints. Different panels may be used, including gypsum wallboards (drywall), wood-fiber panels, fiberglass-mat panels and/or tiles, and many others.

A seam between two adjacent panels attached to the studs in the wall assembly is referred to as "a joint" or "a wall joint." In order to produce an even wall surface and strengthen the wall assembly, conventional methods for preparing and finishing joints include various techniques in which an adhesive, known as a joint compound, is used. First, a joint compound is applied within the joint and a joint-reinforcing tape is then embedded in the joint compound such that the joint is filled with the joint compound. This joint compound can be referred to as the taping grade joint compound. After the taping grade joint compound dries, the joint is coated by applying one or more coats of a joint compound known as the topping or finishing grade joint compound. Some joint compounds are known as all-purpose joint compounds because they can be used in both applications: as the tapping joint compound and also as the topping joint compound. Certain joint compounds and methods for filling and coating joints are disclosed in U.S. Pat. No. 8,931,230, the entire disclosure of which is herein incorporated by reference.

After the last coat of the finishing joint compound dries, the dried joint compound is sanded in order to produce an even wall surface and prepare the wall substrate for painting and/or other decorative finishes.

Two main types of joint compounds are known in the construction industry: drying-type joint compounds and setting-type joint compounds. The drying-type joint compounds are formulated without calcium sulfate hemihydrate. These compounds dry when water evaporates.

As originally described in U.S. Pat. No. 3,297,601, the entire disclosure of which is herein incorporated by reference, conventional setting-type joint compounds are typically formulated with calcium sulfate hemihydrate which can be sourced from calcined gypsum, referred to below as simply "hemihydrate," and its two forms alpha calcium sulfate hemihydrate as "alpha hemihydrate" and beta calcium sulfate hemihydrate as "beta hemihydrate." In conventional setting-type joint compounds, calcium sulfate hemihydrate is the main component used in amounts greater than 50 wt % of the setting-type joint compound total, excluding water. The setting-type joint compounds harden and set when calcium sulfate hemihydrate interacts with water and rehydrates into calcium sulfate dihydrate.

Setting-type joint compounds can be formulated in dry powder form to which water is added at the construction site or as a ready-mixed setting-type joint compound which is pre-mixed with water and one or more set-preventing reagents, including as described in U.S. Pat. No. 5,746,822.

While various set-preventers and set activators have been used in the field in order to improve a setting kinetics of a setting-type joint compound, yet, there still remains the need in the field for setting-type joint compounds which can be used as an all-purpose joint compound and which would have a sufficiently long open time, but would snap-set such that a waiting period between applications is decreased. In addition, there is exigency to maintain levels of compressive strength but facilitate greater sanding ease.

SUMMARY

In one aspect, the present disclosure provides a setting-type joint compound with setting characteristics distinguishable from conventional setting-type joint compounds. The setting-type joint compound disclosed retains a workable consistency over a longer period of time before the chemical reaction occurs that initiates the set or hardening. The time between the set initiating and the material hardening is compressed resulting in a "snap set". The advantage of this "snap set" as one skilled in the art appreciates is that the compound can be worked longer, and once the set begins it can be recoated or sanded very soon. The setting-type joint compound according to this disclosure can be used as an all-purpose setting-type joint compound. Furthermore, the setting-type joint compound according to this disclosure has an improved sandability.

In one aspect, the present disclosure provides a dry-powder setting-type joint compound, the setting-type joint compound comprising: calcium sulfate hemihydrate in an amount from 28 wt % to 50 wt %; calcium carbonate in an amount such that the total amount of calcium sulfate hemihydrate and calcium carbonate is 80 wt % to 95 wt %; a starch binder; a redispersible latex binder; one or more from kaolin clay, sepiolite, bentonite, montmorillonite clay; attapulgite clay, or any mixture thereof; a rheological modifier; a cellulosic thickener; a set retarder; and a set accelerator. Some of the dry-powder setting-type joint compounds may comprise calcium sulfate hemihydrate in the amount from 34 wt % to 46 wt %. In some of these dry-powder setting-type joint compounds, calcium sulfate hemihydrate is a combination of alpha calcium sulfate hemihydrate and beta calcium sulfate hemihydrate and preferably, the alpha-to-beta ratio is in the range between 5:1 to 1:1. In some embodiments, the dry-powder setting type joint compounds do not comprise beta calcium sulfate hemihydrate. In some embodiments, the dry-powder setting-type joint compounds do not comprise alpha calcium sulfate hemihydrate.

Preferred redispersible latex binders in the setting-type joint compounds include, but are not limited to, vinyl acetate ethylene (VAE) copolymers, vinyl acetate/vinyl ester of versatic acid (VAE-VeoVa) copolymers, styrene butadiene, acrylic powder, polyvinyl alcohol, or any combination thereof. Preferred starch binders in the setting-type joint compounds include pregelatinized starch binders.

The dry-powder setting-type joint compounds in this disclosure may further comprise one or more of the following: perlite, resin microspheres, hollow microspheres, or any combination thereof. In some embodiments, the setting-type joint compounds comprise from 5 wt % to 20 wt % of expanded perlite. In some embodiments, the setting-type joint compounds comprise 0.01 wt % to 5 wt % of attapulgite clay. In some embodiments of the dry-powder setting-type joint compound, the rheological modifier is a substituted starch. In some embodiments of the dry-powder setting-type joint compound, the cellulosic thickener includes one or more of the following: methylcellulose, hydroxypropyl methylcellulose, hydroxyethyl cellulose, hydroxypropyl cellulose, ethylcellulose, methylhydroxypropyl cellulose, ethylhydroxyethyl cellulose, cellulose-based gum, carboxymethyl cellulose, or any combination thereof.

In some embodiments of the dry-powder setting-type joint compound, the set retarder includes one or more of the following: Suma retarder, Rochelle salts, ammonium tartrate, sodium citrate, citric acid, sodate retarder, cream of Tartar, a non-calcium bearing phosphate, or any mixture thereof.

In some preferred embodiments of the dry-powder setting-type joint compound, the set accelerator comprises ground calcium sulfate dihydrate.

Any of the dry-powder setting-type joint compounds in this disclosure can be formulated as a ready-mixed setting-type joint compound with water and one or more of non-calcium bearing phosphates.

In further aspect, the present disclosure provides a method of finishing a seam between two adjacent wall panels, the method comprising: a) mixing the dry-powder setting-type joint compound of this disclosure with water into a joint-compound paste; b) filling the seam with the joint-compound paste; c) embedding a joint reinforcement tape into the joint-compound paste in the seam; and d) covering the seam with one or more coats of the joint-compound paste. The joint compound may be sanded after the joint-compound paste hardened.

In yet another aspect, the present disclosure provides a method for repairing a wall surface, the method comprising mixing the dry-powder setting-type joint compound of this disclosure with water and obtaining a joint-compound paste or obtaining the ready-mixed setting type joint compound of this disclosure and mixing the ready-mixed setting-type joint compound with one or more accelerators and thereby obtaining a ready-mixed joint compound paste, and applying the joint compound paste or ready-mixed joint compound paste to the surface of the wall.

BRIEF DESCRIPTION OF THE DRAWINGS

FIG. 2 depicts the results of certain tests performed on joint compound samples disclosed herein.

FIG. 3 depicts certain notes and the results of certain tests performed on joint compound samples disclosed herein.

FIG. 4 depicts the formula for the differences in color of joint compound samples, as discussed in Example 2 herein.

DETAILED DESCRIPTION

Figure 1:
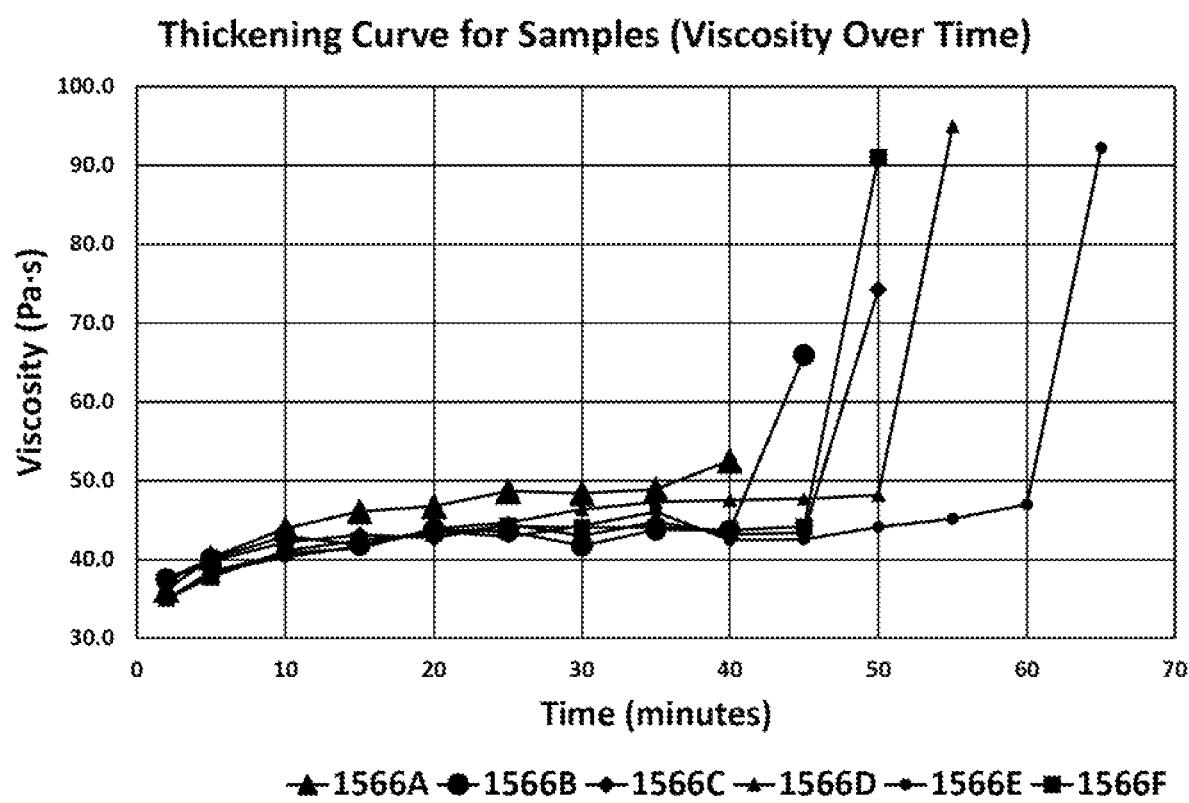
FIG. 1 depicts thickening curves for setting-type joint compounds containing the following amounts of calcium sulfate hemihydrate: 1556A (control, about 54 wt %), 1556B (about 47 wt %), 15560 (about 32 wt %), 1556D (about 47 wt %), 1556E (about 35 wt %) and 1556F (control, about 54 wt %).

In one aspect, this disclosure provides a setting-type joint compound which retains a workable viscosity longer than conventional setting-type joint compounds. Furthermore, the setting-type joint compound according to this disclosure snap-sets. The setting-type joint compound according to this disclosure can be used as an all-purpose setting-type joint compound. Furthermore, the setting-type joint compound according to this disclosure has an improved sandability. In another aspect, the setting-type joint compound after drying has a compressive strength within 300 psi of a comparable setting-type joint compound with greater than 50 wt % calcium sulfate hemihydrate at similar densities.

The setting-type joint compounds of this disclosure comprise a combination of calcium sulfate hemihydrate and calcium carbonate. In the setting-type joint compounds, the total amount of calcium sulfate hemihydrate is less than 50 wt % by dry weight of the joint compound total, excluding water. Preferably, the setting-type joint compounds of this disclosure comprise calcium sulfate hemihydrate in an amount in the range from about 28 wt % to about 50 wt %, 49 wt %, 48 wt %, 47 wt %, 46 wt %, 45 wt %, or 44 wt % of the setting-type joint compound total dry weight, excluding water. Setting-type joint compounds which comprise 50 wt % or more calcium sulfate hemihydrate of the composition total, excluding water, are not suitable.

Some preferred setting-type joint compounds comprise calcium sulfate hemihydrate in an amount in the range from 28 wt %, 29 wt %, 30 wt %, 31 wt %, 32 wt %, 33 wt %, 34 wt %, 35 wt % or 36 wt % to 48 wt % of the setting-type joint compound total dry weight, excluding water. Such setting-type joint compounds include those which comprise calcium sulfate hemihydrate in any amount in the range from 28 wt % to 46 wt %, of the setting-type joint compound total dry weight, excluding water.

In this disclosure, "wt %" means percent in weight. In this disclosure, a setting-type joint compound can be prepared by mixing active ingredients and obtaining a dry powder setting-type joint compound. The setting-type joint compound can then be mixed with water in order to obtain a setting-type joint compound paste. Accordingly, "wt % from the setting-type joint compound total dry-weight, excluding water" means percentage in weight from all active ingredients in total (dry powder setting-type joint compound), excluding the amount of water which is added later during the mixing of the dry powder with water into a paste. See also Table 1 in this disclosure in which amounts are shown in wt % from the setting-type joint compound total dry weight, excluding water. In this disclosure, "the composition excluding water" may be also referred to as the dry mixture or dry powder or the dry weight of the setting-type compound total, excluding water.

In this disclosure, the term "gypsum" can be used interchangeably with calcium sulfate dihydrate, terra alba or landplaster. In this disclosure, the term "plaster of Paris" can be used interchangeably with calcined gypsum, stucco, calcium sulfate semihydrate, calcium sulfate half-hydrate or calcium sulfate hemihydrate. A person of skill will appreciate that the present setting-type joint compound compositions include those which comprise calcium sulfate hemihydrate sourced as calcined gypsum in an amount in the range from about 28 wt % to about 50 wt %, from about 30 wt % to about 49 wt %, from about 28 wt % to about 48 wt %, from about 28 wt % to about 47 wt %, from about 28 wt % to about 46 wt %, from about 28 wt % to about 45 wt %, or from about 28 wt % to about 44 wt % of the composition total (the dry powder mixture), excluding water.

The present setting-type joint compounds must comprise less than 50 wt %, but more than 28 wt % of calcium sulfate hemihydrate from the setting-type joint compound total dry weight, excluding water. Accordingly, the setting-type joint compounds of this disclosure can be referred in this disclosure as the setting-type joint compound with a reduced amount of calcium sulfate hemihydrate. It was unexpectedly found that reducing the total amount of calcium sulfate hemihydrate to the range from 28 wt % to 50 wt % of the setting-type joint compound dry weight total, excluding water, produces a setting-type joint compound with a longer period of time during which the viscosity stays in the workable range for approximately the same Vicat setting time. Vicat setting time was measured as discussed later in this disclosure and as is known in the art. Unexpectedly, the setting-type joint compounds manifest superior snap-set behavior. Furthermore, the setting-type joint compounds of this disclosure can be easily sanded and their sandability is improved in comparison to conventional setting-type joint compounds which comprise more than 50 wt % of calcium sulfate hemihydrate. Additionally, the compressive strength of the inventive setting-type joint compound compositions have dry compressive strengths adjacent to comparable setting-type joint compounds with greater than 50 wt % calcium sulfate hemihydrate at similar densities.

This observation is supported by FIG. 1 which provides a comparative analysis for a conventional setting-type joint compound which comprises 54 wt % calcium sulfate hemihydrate (see the 1556A thickening curve) versus inventive setting-type joint compounds which comprise 41 wt %, 31 wt %, 46 wt % or 34 wt % of calcium sulfate hemihydrate (see 1556B, 1556C, 1556D and 15556E thickening curves, respectively). All amounts are in weight from the setting-type joint compound total dry weight, excluding water. In FIG. 1, Brookfield viscosity was measured as a function of time.

In FIG. 1 and for the rest of this disclosure, viscosity means "Brookfield viscosity" and it is measured at room temperature. The term "room temperature" means a temperature between 20 and 25 degrees Celsius, preferably, room temperature is 23° C. A person of skill measures viscosity with a viscometer. Viscometers are commercially available from many different sources, including C.W. Brabender Instruments, Inc., Hackensack, NJ under the trade name Visco-Corder™ which uses reaction torque for dynamic measurement of viscosity. In the present disclosure including the data shown in FIG. 1, the viscosity was measured according to ASTM C474-05, Section 5 (Standard Test Methods for Joint Treatment Materials for Gypsum Board Construction) using a CW Brabender viscometer with a Type-A Pin, sample cup size of ½ pint with a 250 cm-gm cartridge Brabender Torque-Head and an RPM of 75.

As can be seen in FIG. 1, the inventive setting-type joint compounds with reduced calcium sulfate hemihydrate keep a workable viscosity without significant thickening longer than the control setting-type joint compound. In view of this, it is also unexpected that the inventive setting-type joint compounds snap-set, meaning that the compounds traverse from a workable viscosity compound to a hardened form in a short period of time. The snap-set can take place in less than 10 minutes, and even more preferably less than in 5 minutes after the inventive setting-type joint compound has maintained a workable viscosity for over 30 minutes. As can be seen in FIG. 1, the control conventional setting-type joint compound does not possess this snap-setting property to the same extent as the inventive setting-type joint compounds. The snap-setting property of the setting-type joint compounds of this disclosure is an important technical advantage because the snap-setting property is indicative of a time period needed for a setting-type joint compound to harden sufficiently enough before the setting-type joint compound can be sanded and/or before another coat of the setting-type joint compound can be applied.

As stated in U.S. Pat. No. 7,754,007, raw gypsum is found in nature in the dihydrate form. In this form, there are approximately two water molecules of water associated with each molecule of calcium sulfate. In order to produce the hemihydrate form, the gypsum can be calcined to drive off some of the water. As is also explained in U.S. Pat. No. 7,754,007, two different forms of calcium sulfate hemihydrate can be produced in calcination methods: alpha crystals and beta crystals. The alpha crystals are less acicular in shape than the beta crystals. Alpha calcium sulfate hemihydrate has a lower water demand than beta calcium sulfate hemihydrate and as is known in the art, the combination of alpha and beta calcium sulfate hemihydrate controls the amount of water needed to form a workable gypsum slurry.

TABLE 1

Inventive setting-type joint compound formulations with useable ranges in percentage dry weight for raw materials and an example range for when a combination of alpha calcium sulfate hemihydrate and beta calcium sulfate hemihydrate is used.

| Raw Material | Useable Range (wt %) | Preferred Range with Alpha and Beta Hemihydrate (wt %) |
|---|---|---|
| Total Calcium Sulfate Hemihydrate | 28 to 49.9 | 34 to 46 |
| Alpha Calcium Sulfate Hemihydrate | 0 to 49.9 | 17 to 36.8 |
| Beta Calcium Sulfate Hemihydrate | 0 to 49.9 | 6.8 to 23 |
| Calcium Carbonate and Calcium Sulfate Hemihydrate Combined | 80 to 95 | 80 to 90 |
| Calcium Carbonate | 30.1 to 65 | 34 to 56 |
| Other Mineral Additives (Talc, Mica, Sand, Flash and Mixture Thereof) | 0 to 20 | 0 to 10 |
| Lightweight Filler (e.g., Perlite) | 0 to 20 | 3 to 20 |
| Clay (e.g., Attapulgite Clay) | 0.01 to 5 | 0.01 to 5 |
| Rheological Modifier | 0 to 2 | 0.01 to 2 |
| Binder (i.e., combination of starch, polyvinyl alcohol, acrylic polymers, redispersible latex polymers, and the like) | 0.5 to 20 | 0.5 to 10 |
| Cellulosic Thickener | 0.01 to 2 | 0.1 to 1 |
| Retarder | 0.01 to 10 | 0.1 to 10 |
| Accelerator | 0.001-1.0 | 0.01 to 1.0 |
| Other Ingredients (e.g., biocide, defoamer, surfactant, humectant, pigments) | 0 to 5 | 0.01 to 5 |

Some of the present setting-type joint compounds may comprise a combination of alpha calcium sulfate hemihydrate and beta calcium sulfate hemihydrate, while other setting-type joint compounds of this disclosure may be prepared with alpha calcium sulfate hemihydrate and do not comprise beta calcium sulfate hemihydrate. In further embodiments, the setting-type joint compounds of this disclosure may be prepared with beta calcium sulfate hemihydrate and do not comprise alpha calcium sulfate hemihydrate.

If a combination of alpha calcium sulfate hemihydrate with beta calcium sulfate hemihydrate is used, then alpha-to-beta ratio may be in the range between 5:1 and 1:1 by weight, respectively. For example, some joint compounds may contain 1 part of beta calcium sulfate hemihydrate for each 5 parts of alpha calcium sulfate hemihydrate by weight.

The present setting joint compounds of this disclosure comprise calcium carbonate as the second necessary component. The total amount of calcium carbonate and calcium sulfate hemihydrate combined in the present setting-type joint compound may be in the range between 80 and 95 wt % of the setting-type joint compound total, excluding water, and preferably in the range between 80 and 90 wt % of the setting-type joint compound total, excluding water, and most preferably in the range from 85 wt % to 90 wt % of the setting-type joint compound total, excluding water. As calcium sulfate hemihydrate is used in an amount from about 30 wt % to about 50 wt % of the composition total, excluding water, the amounts of calcium carbonate in the setting-type joint compound should be adjusted accordingly such that the total of calcium sulfate hemihydrate and calcium carbonate in the composition, excluding water, is in the range between 80 and 95 wt % of the composition total, excluding water, and preferably in the range between 80 and 90 wt % of the composition total, excluding water, and most preferably in the range from 85 wt % to 90 wt % of the composition total, excluding water.

Suitable commercial sources of calcium carbonate include OMYACARB™ (Calcium Carbonate) from Omya, HUBERCARB™ (Calcium Carbonate) from Huber Engineered Materials. In some of the setting-type joint compounds according to this disclosure, calcium carbonate may be sourced from dolomitic limestone and/or limestone.

The third necessary component in the setting-type joint compound of the present disclosure is a binder. Suitable binders include, but are not limited to, starch, polyvinyl alcohol, acrylic polymers and/or co-polymers, including polyacrylamide and polyvinylacrylate, polyvinyl acetate, ethylene vinyl acetate, or any combination thereof. The setting-type joint compounds of this disclosure may comprise from 0.5 wt % to 20 wt % of the binder by dry weight of the setting-type joint compound total, excluding water.

Preferred binders according to this disclosure include redispersible latex powders which may be further used in combination with one or more starches. Preferred redispersible latex powder binders include, but not limited to, vinyl acetate ethylene (VAE) copolymers, vinyl acetate/vinyl ester of versatic acid (VAE-VeoVa) copolymers, styrene butadiene, acrylic powder, polyvinyl alcohol, or any combination thereof. The setting-type joint compounds of this disclosure may comprise from 0.1 wt % to 20 wt % of the redispersible binder by dry weight of the setting-type joint compound total, excluding water.

In some embodiments, the setting-type joint compounds according to this disclosure comprise one or more starches and one or more redispersible latex powder binders. In some embodiments, the setting-type joint compound according to this disclosure comprises at least one starch binder and one or more of the following redispersible latex powder binders: vinyl acetate ethylene (VAE) copolymers, vinyl acetate/vinyl ester of versatic acid (VAE-VeoVa) copolymers, styrene butadiene, acrylic powder, polyvinyl alcohol, or any combination thereof. In these formulations, the redispersible latex binder can be used in any suitable amount, including from 0.1 wt % to 20 wt %, and more preferably from 0.1 wt % to 1 wt % of the redispersible binder by dry weight of the setting-type joint compound total, excluding water. Preferred redispersible binders include vinyl acetate ethylene (VAE) copolymers and/or polyvinyl alcohol. A starch binder in these formulations can be used in an amount from 0.5 wt % to 20 wt % of the starch binder by dry weight of the setting-type joint compound total, excluding water. At least in some embodiments, the starch binder can be used without the redispersible latex powder binders.

Suitable starches include synthetic starches, natural starches, modified natural starches or any mixture thereof. A suitable starch binder comprises, consists essentially of, or consists of wheat starch, corn starch, potato starch, sweet potato, rice starch, tapioca starch, or any mixture thereof. Suitable starches can be pregelatinized and/or otherwise chemically modified. Modified starches include an alkylated starch, including ethylated or propylated starch, or an acid-modified starch. Wheat starch is one of the preferred starches. In some preferred embodiments, a starch binder comprises, consists essentially of, or consists of a pregelatinized starch.

Suitable pregelatinized starches include pregelatinized wheat starch, pregelatinized corn starch, pregelatinized potato starch, pregelatinized sweet potato starch, pregelatinized corn starch, rice starch, tapioca starch, or any mixture thereof. Preferred pregelatinized starch is pregelatinized wheat starch, but other modified and/or pregelatinized starches can be also used.

The present setting-type joint compounds may comprise from about 0.5 wt % to 20 wt % of one or more starches by dry weight of the setting-type compound total, excluding water.

The present setting-type joint compounds may comprise a lightweight material which can be used in order to obtain a light-weight, setting-type joint compound. Suitable lightweight materials include perlite, including expanded perlite which may be further coated or uncoated. Instead of or in addition to perlite, resin microspheres or hollow microspheres, e.g. glass bubbles, can be used as described in U.S. Pat. No. 8,931,230.

Some preferred setting-type joint compounds of this disclosure comprise perlite, and more preferably expanded perlite. Use of expanded perlite in light weight joint compounds is generally known from U.S. Pat. No. 4,454,267, the entire disclosure of which is herein incorporated by reference. The expanded perlite may be further coated as described for example in U.S. Pat. No. 4,525,388. Expanded perlite can be used in any amount. In some embodiments, the setting-type joint compound comprises perlite, preferably expanded perlite, and more preferably uncoated expanded perlite, in any amount in the range from about 5 wt % to about 20 wt % by dry weight of the setting-type joint compound total, excluding water.

The present setting-type joint compounds preferably also comprise clay. Suitable clays include kaolin clay, sepiolite, bentonite, montmorillonite clay, attapulgite clay, or any mixture thereof. In certain preferred embodiments, the present setting-type joint compounds comprise attapulgite clay.

In some embodiments, the present setting-type joint compounds may comprise from 0.01 wt % to 5 wt %, from 0.01 wt % to 4 wt %, from 0.01 wt % to 3 wt %, from 0.01 wt % to 2 wt %, from 0.01 wt % to 1 wt %, from 0.1 wt % to 5 wt %, from 0.1 wt % to 4 wt %, from 0.1 wt % to 3 wt %, from 0.1 wt % to 2 wt %, or from 0.1 wt % to 1 wt % of clay, preferably attapulgite clay, by dry weight of the setting-type compound total, excluding water.

The present setting-type joint compounds may further comprise one or more polysaccharide-based rheological modifiers which may be a substituted starch. The polysaccharide-based rheological modifiers may be used in any amount needed to adjust water retention of the present veneer finish compounds. Typically, from 0.01 wt % to 2 wt %, from 0.01 wt % to 1 wt %, from 0.01 wt % to 0.5 wt %, or from 0.01 wt % to 0.2 wt % of the polysaccharide-based rheological modifier, such as modified starch, can be used by weight of the setting-type joint compound total, excluding water.

In the present setting-type joint compounds, the preferred polysaccharide-based rheological modifier is a modified, e.g. substituted, starch. Suitable modifications introduce functional groups, such as anionic groups, into a starch molecule. Modifications may include etherification, esterification, and/or oxidation of starch molecules. Preferred substituted starches include carboxylated starch, carboxy methyl starch, hydrolyzed starch, starch acetate, hydroxypropyl starch and phosphorylated starch. Preferred anionic starches include anionic corn starch.

The present setting-type joint compounds may further comprise one or more cellulosic thickeners. Any of the conventional cellulosic thickeners can be used. The cellulosic thickeners include cellulose ethers including carboxymethylcellulose, methylcellulose and its derivatives, hydroethylcellulose and derivatives, and others. Preferred cellulosic thickeners include, but are not limited to, methylcellulose, hydroxypropyl methylcellulose, hydroxyethyl cellulose, hydroxypropyl cellulose, ethylcellulose, methylhydroxyprolyl cellulose, ethylhydroxyethyl cellulose, cellulose-based gum, carboxymethyl cellulose, or any combination thereof. The cellulosic thickeners can be used in any suitable amount in order to adjust the consistency of the setting-type joint compound, as may be needed. In some embodiments, the cellulosic thickener can be used in an amount from 0.01 wt % to 2 wt %, and more preferably in an amount from 0.1 wt % to 1 wt %, by dry weight of the setting-type joint compound total, excluding water.

The setting-type joint compounds of this disclosure may further comprise one or more of set retarders. Any retarder known to be used in conventional setting-type joint compounds can be used in the present formulations as well. Preferred retarders include commercially available Suma retarder which is a protein-based and/or amino acid-based retarder common in the formulation of gypsum-based products. Suma retarder can be used alone or in combination with one or more of other known retarders such as Rochelle salts, ammonium tartrate, sodium citrate, citric acid and sodate retarder, cream of Tartar (potassium bitartrate). Amounts of the retarder can be adjusted as needed in order to increase or decrease a time period during which the setting-type joint compound is workable. For ready-mixed setting type joint compounds, preferred retarders also include non-calcium bearing phosphates, including zinc hexametaphosphate, potassium tripolyphosphate, tetra sodium pyrophosphate, tetra potassium pyrophosphate, sodium tripolyphosphate, monoammonium phosphate, monobasic potassium phosphate, or any combination thereof, including as described in U.S. Pat. No. 5,746,822, the entire disclosure of which is herein incorporated by reference. Typically, from about 0.01 wt % to about 10 wt % of the retarder can be used, based on the dry weight of the setting-type joint compound total, excluding water.

The setting-type joint compounds of this disclosure may further comprise one or more of set accelerators. Suitable set accelerators include without limitation climatic stable accelerator (CSA) which comprises ground calcium sulfate dihydrate and is available from United States Gypsum Company, Chicago, Ill., heat resistant accelerator (HRA), terra alba and any mixture thereof, as typically used in formulations with calcined gypsum, including as described in U.S. Pat. No. 7,754,007, the entire disclosure of which is herein incorporated by reference. Other set accelerators which are particularly suitable for ready-mixed setting-type joint compounds include zinc sulfate, aluminum sulfate, potassium sulfate, and any mixture thereof, e.g. as described in U.S. Pat. No. 5,746,822, the entire disclosure of which is herein incorporated by reference. Amounts of the accelerator can be adjusted as needed, depending on the amount of the retarder used. Typically, from about 0.001 wt % to about 1 wt % of the accelerator can be used, based on the dry weight of the setting-type joint compound total, excluding water.

The setting-type joint compounds of this disclosure may also comprise other additives typically used in conventional setting-type joint compounds. Examples of such additives include without limitations fly ash, mica, talc, sand, or any mixture thereof.

In addition to the above components, the setting-type joint compounds may comprise one or more defoamers; humectants, e.g. glycerin and/or polyols; biocides; surfactants; and/or pigments. These components can be typically used in an amount from about 0.01 wt % to about 5 wt %, and preferably from 0.05 wt % to 1 wt % by dry weight of the setting-type joint compound total, excluding water.

The setting-type joint compounds according to this disclosure can be formulated as a dry powder setting-type joint compound to which the user then adds water at a job site in order to produce a setting-type joint compound paste. Water can be added in any amount sufficient to produce a workable mixture. Typically, water can be added in an amount sufficient to produce a mixture, wherein about 50 to 70 cc (cubic centimeters) of water is typically used for 100 g of the dry powder setting-type joint compound.

In alternative, the setting-type joint compound can be formulated as a ready-mixed setting-type joint compound. The ready-mixed setting-type joint compound is formulated with water during manufacturing and prior to packaging. The ready-mixed setting-type joint compounds of this disclosure may comprise the same component as described for the dry-powder formulations. The ready-mixed setting type joint compounds may further comprise from 20 wt % to 60 wt %, and more preferably from 25 wt % to 55 wt %, and most preferably from 30 wt % to 50 wt %, of water by weight of the ready-mixed setting-type joint compound total. The ready-mixed formulations are preferably packaged into an air-tight container.

The ready-mixed setting-type joint compounds may further comprise one or more of set retarders which prevent a premature setting reaction during storage. Suitable retarders include non-calcium bearing phosphates, including zinc hexametaphosphate, potassium tripolyphosphate, tetra sodium pyrophosphate, tetra potassium pyrophosphate, sodium tripolyphosphate, monoammonium phosphate, monobasic potassium phosphate, or any combination thereof. Typically, from about 0.1 wt % to about 10 wt % of the retarder can be used, based on the dry weight of the setting-type joint compound total, excluding water.

The setting-type joint compounds of this disclosure are useful in a variety of applications, including but not limited to, as an all-purpose joint compound for filling and/or coating (finishing) joints between wall panels. The setting-type joint compound according to this disclosure can be also used in wall repair projects, e.g, as a spackling compound for repairing wall indentations and cracks. The setting-type joint compound of this disclosure can be also used as a base coat for wall panels. The setting-type joint compound is particularly suitable for applications to a gypsum wallboard. However, it may be also used on other substrates, including, but not limited to, cementitious substrates, wood fiber panels, roof tiles, and/or fiberglass mat panels.

The setting-type joint compound can be formulated as a paste suitable for application by a hand trowel or as a solution for application as a spray.

In further aspect, the present disclosure provides methods in which the setting-type joint compound of this disclosure is placed within a seam (joint) between two wall panels. A joint reinforcement tape is then embedded in the setting-type joint compound and the setting-type joint compound is allowed to harden. After the setting-type joint compound hardens, the joint is then coated with one or more coats of the setting-type joint compound. The setting-type joint compound of this disclosure can be used with various joint reinforcement tapes, including paper joint reinforcement tape and/or fiberglass mesh joint tape. While the present setting-type joint compound can be used as an all-purpose joint compound, e.g. for taping as well as for finishing the joint, the setting-type joint compound can be also used in combination with other joint compounds. For example, the present setting-type joint compound can be used as a topcoat (finishing a joint), while any of conventional joint compounds can be used for taping and embedding a joint reinforcement tape.

Any of the methods, including wall installation and/or wall repair and/or coating joints, may further comprise sanding the setting-type joint compound after the compound has hardened sufficiently.

The setting-type joint compound can be applied to a substrate, e.g. a joint and/or wall panel, by troweling, roller applied and/or joint knife or by spraying.

The present setting-type joint compound can be also applied over a substrate to conceal minor wall defects, e.g. screwheads and in order to fill in wall cracks. In further aspects, this disclosure provides methods for patching a surface and/or laminating a surface with the setting-type joint compound according to this disclosure. Suitable surfaces include, but not limited to, wallboard and fiberboard. In these applications, if the setting-type joint compound is used in its powder form, water is added to the powder to mix a setting-type joint compound paste. In alternative, a ready-mixed setting-type joint compound can be used. Prior to use, one or more accelerators can be added to the joint compound paste. The setting-type type joint compound paste is then applied to the substrate and is allowed to harden. Once the setting-type joint compound paste hardens, it can be sanded and/or coated with a primer and/or coated with a paint.

This disclosure includes the following non-limiting examples.

Example 1. Preparation and Testing of Setting-Type Joint Compounds with Reduced Calcium Sulfate Hemihydrate The following setting-type joint compound samples were prepared by mixing dry components in the amounts as listed in Table 2 below.

TABLE 2

Setting-Type Joint Compound Formulations Showing Ingredients and Weight in Grams of Each Ingredient for Each Sample

| Ingredient | Sample ID | | | | | |
|---|---|---|---|---|---|---|
| | 1566A Control | 1566B Control | 1566C Control | 1566D Control | 1566E Control | 1566F Control |
| Alpha Calcium Sulfate Hemihydrate | 1350 | 1000 | 700 | 1350 | 1000 | 1550 |
| Beta Calcium Sulfate Hemihydrate | 200 | 200 | 200 | 0 | 0 | 0 |
| Calcium carbonate | 980 | 1330 | 1630 | 1180 | 1530 | 980 |
| Perlite | 180 | 180 | 180 | 180 | 180 | 180 |
| Attapulgite Clay | 119 | 119 | 119 | 119 | 119 | 119 |
| Starch | 32.6 | 32.6 | 32.6 | 32.6 | 32.6 | 32.6 |
| Polyvinyl alcohol | 12 | 12 | 12 | 12 | 12 | 12 |
| Cellulosic thickener | 9.9 | 9.9 | 9.9 | 9.9 | 9.9 | 9.9 |

TABLE 2-continued

Setting-Type Joint Compound Formulations Showing Ingredients and Weight in Grams of Each Ingredient for Each Sample

| Ingredient | Sample ID | | | | | |
|---|---|---|---|---|---|---|
| | 1566A Control | 1566B Control | 1566C Control | 1566D Control | 1566E Control | 1566F Control |
| Accelerator | 1 | 1 | 1 | 1 | 1 | 1 |
| Retarder | 3 | 3 | 3 | 3 | 3 | 3 |
| Total Weight | 2887.5 | 2887.5 | 2887.5 | 2887.5 | 2887.5 | 2887.5 |

As can be seen from Table 2, sample 1566A was a control sample with the total amount of calcium sulfate hemihydrate about 54 wt % of the composition total, excluding water. Sample 1566E contained about 35 wt % alpha calcium sulfate hemihydrate and about 7 wt % beta calcium sulfate hemihydrate. Sample 1566C contained about 25 wt % alpha calcium sulfate hemihydrate and about 7 wt % beta calcium sulfate hemihydrate. Sample 1566D contained about 47 wt % alpha calcium sulfate hemihydrate and no beta calcium sulfate hemihydrate. Sample 1566E contained about 35 wt % alpha calcium sulfate hemihydrate and no beta calcium sulfate hemihydrate. Control sample 1566F contained the same amount of calcium sulfate hemihydrate in total as control sample 1566A, but only alpha calcium sulfate hemihydrate was used and no beta calcium sulfate hemihydrate.

Each of the dry powder setting-type joint compound samples from Table 2 was mixed with water as listed in Table 3 below. The setting-type joint compounds were then analyzed for the Brookfield viscosity, Vicat set time, dry density, wet density, bond to paper tape, shrinkage, compressive strength and other parameters as reported in Tables 3-4 below as well as FIGS. 2 and 3. The thickening curve for each of the samples was also plotted as a function of the Brookfield viscosity from time. These thickening curves are shown in FIG. 1. The dynamic viscosity has been converted to the SI unit of Pascal-seconds (Pa·s) in FIG. 1. FIG. 2 shows the results of certain standard joint compound tests known in the art that were applied to the trial material. All tests in FIG. 2 were performed in accordance with ASTM 0474. The tests include (a) obtaining three test samples of each trialed material to determine the amount of joint compound adhesion to paper tape after an X-cut under various temperature and relative humidity conditions as indicated; (b) the total amount of cracking in inches on a deep-fill (⅛ inch thick) application of the setting compound over drywall that is force dried in a conditioning room at 95 degrees Fahrenheit and 10% relative humidity for each trialed material; and (c) the percent shrinkage after drying of each trialed material.

TABLE 3

Brookfield viscosity at 2 minutes after mixing, Vicat set, and dry and wet densities for the inventive setting-type joint compounds.

| | 1566A Control | 1566B Trial 1 | 1566C Trial 2 | 1566D Trial 3 | 1566E Trial 4 | 1566F Trial 5 |
|---|---|---|---|---|---|---|
| Brookfield Viscosity, BU (2 min) | 458.0 | 475.7 | 473.4 | 443.0 | 443.0 | 442.9 |
| Vicat Set Time, min. | 56 | 63 | 69 | 72 | 83 | 66 |
| Dry Density, lb/cuft (*0.303) | 38.88 | 38.3 | 38.97 | 40.79 | 40.81 | 39.42 |

TABLE 3-continued

Brookfield viscosity at 2 minutes after mixing, Vicat set, and dry and wet densities for the inventive setting-type joint compounds.

|  | 1566A Control | 1566B Trial 1 | 1566C Trial 2 | 1566D Trial 3 | 1566E Trial 4 | 1566F Trial 5 |
|---|---|---|---|---|---|---|
| Wet Density, lbs/gal (1/2 pint/34.71) | 10.23 | 10.12 | 10.03 | 10.16 | 10.15 | 10.16 |

TABLE 4

Brookfield viscosity over time for the inventive setting-type joint compounds.

| Brookfield Viscosity BU: Thickening Curve | 1566A Control | 1566B Trial 1 | 1566C Trial 2 | 1566D Trial 3 | 1566E Trial 4 | 1566F Trial 5 |
|---|---|---|---|---|---|---|
| 5 min | 510 | 508 | 504 | 487 | 486 | 479 |
| 10 min | 557 | 544 | 534 | 517 | 511 | 521 |
| 15 min | 584 | 530 | 546 | 525 | 528 | 537 |
| 20 min | 592 | 554 | 541 | 556 | 553 | 548 |
| 25 min | 616 | 552 | 563 | 566 | 543 | 561 |
| 30 min | 613 | 529 | 545 | 587 | 561 | 558 |
| 35 min | 619 | 555 | 567 | 599 | 583 | 558 |
| 40 min | 666 | 553 | 548 | 602 | 538 | 554 |
| 45 min | max torque | 835 | 549 | 604 | 539 | 559 |
| 50 min | — | max torque | 940 | 610 | 559 | 1152 |
| 55 min | — | — | max torque | 1202 | 572 | max torque |
| 60 min | — | — | — | max torque | 595 | — |
| 65 min | — | — | — | — | 1167 | — |
| 70 min | — | — | — | — | max torque | — |

In Table 2, Vicat Set Time was measured in minutes according to modified ASTM C-472 (Standard Test Methods for Physical Testing of Gypsum, Gypsum Plasters and Gypsum Concrete, ASTM International, West Conshohocken, PA, 2014). The Vicat set time was started at the time water was added to the dry mixture of the setting-type joint compound. Each sample was scooped into a cup at the use viscosity. A 300-gram Vicat needle was held above the center, perpendicular to the surface of the joint compound. The needle was held to the surface and released to fall freely of its own weight. The Set time was determined when the needle failed to penetrate halfway into the joint compound surface. As can be seen in Table 2, the setting-type joint compounds according to this disclosure have a longer open time before they set in comparison to the control lightweight (>50% hemihydrate) setting-type joint compound. One of the technical advantages of the present setting-type joint compounds is that they maintain a consistent workable viscosity during applications.

FIG. 3 depicts a chart that lists further tests that were conducted on the samples. One of the items measured was compressive strength in psi on dried, 2-inch cubes according to ASTM C-472. Dry density of 2 inch cubes made from the trialed materials was also measured in pounds per cubic foot (PCF) according to ASTM C-474. Also in FIG. 3 are some notes made by the individual who mixed the various samples of trialed materials. These notes describe the workability, among other things, of the sample which those skilled in the art will appreciate. Hardness of samples relative to the hardness of drywall was also measured in accordance with ASTM C-474 using a durometer.

Example 2. Color Testing the Setting-Type Joint Compounds of Example 1

One of the important characteristics of a joint compound is its ability to color blend with a substrate to which it has been applied. Typically, walls are prepared in white or of white color. Thus, there is a need in the field for a setting-type joint compound which is of white color after the compound has dried. Color differences in the setting-type joint compounds may be measured by the L*a*b* method. This method employs a colorimeter such as for example ColorQUEST® from HunterLab. The L*a*b* method allows for the detection of even slight differences between two colors. In the L*a*b* method, color difference is defined as a numerical comparison of a sample's color to a standard. Three different coordinates are used:

L* indicates lightness (black/white), with L*=100 being pure white and L*=0 being pure black;

a* is the red/green coordinate, with a*=−100 being perfectly green, and a*=100 being perfectly red, and b* is the yellow/blue coordinate, with b*=100 being perfectly yellow and b*=−100 being perfectly blue.

Figure 4:
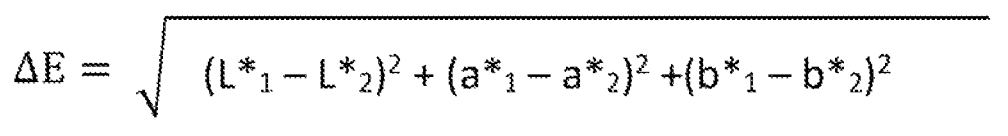

All measurements are conducted against standards provided with a colorimeter for each coordinate. Each of two samples are measured for L*, a* and b*. Delta E is then calculated using the formula shown in FIG. 4.

Delta E represents a difference in color between the first sample and a second sample. Most humans can easily detect a color change between two colors if delta E between these two colors is 3 or higher. An experienced user is able to detect a change in color which is as low as 0.5-1.

The setting-type joint compounds of Example 1 were analyzed by the L*a*b* method and the results of this analysis are reported in Table 5 (color differences in the wet setting-type joint compounds of this disclosure versus the control conventional setting-type joint compound) and Table 6 (color differences in the dry setting-type joint compounds of this disclosure versus the control conventional setting-type joint compound).

TABLE 5

Wet Averages

|  | 1566A | 1566B | 1566C | 1566D | 1566E | 1566F |
|---|---|---|---|---|---|---|
| L* | 79.25 | 80.40 | 81.66 | 78.41 | 79.88 | 78.11 |
| a* | 0.29 | 0.32 | 0.32 | 0.34 | 0.34 | 0.34 |
| b* | 5.38 | 5.46 | 5.63 | 5.70 | 5.75 | 5.54 |
| ΔE | 0.00 | 1.15 | 2.42 | 0.90 | 0.73 | 1.15 |

TABLE 6

Dry Averages

|  | 1566A | 1566B | 1566C | 1566D | 1566E | 1566F |
|---|---|---|---|---|---|---|
| L* | 91.21 | 91.76 | 92.72 | 90.93 | 91.00 | 90.24 |
| a* | 0.18 | 0.23 | 0.20 | 0.21 | 0.22 | 0.21 |
| b* | 3.65 | 3.86 | 3.87 | 3.89 | 4.20 | 3.92 |
| ΔE | 0.00 | 0.59 | 1.53 | 0.37 | 0.59 | 1.01 |

In the above tables, a ΔE value of greater than 3 would mean that the color change were significant and would be discernible by an ordinary observer. As can be seen from Tables 5 and 6, the setting-type joint compounds with reduced calcium sulfate hemihydrate match in color with the conventional setting-type joint compounds.

Example 3. Further Embodiments of Setting-Type Joint Compounds with Reduced Calcium Sulfate Hemihydrate Exhibiting Greater Sandability The setting-type joint compounds were prepared by mixing the raw materials with water as shown in Tables 7 and 8 to demonstrate improved sandability of the inventive compositions when measured against a comparable lightweight setting-type joint compound (control with >50 wt % hemihydrate).

TABLE 7

Example inventive setting-type joint compound formulations 3.1.2 displaying improved sandability over a comparable control lightweight formulation 3.1.1 with > 50 wt % hemihydrate. All weights in this table are in grams.

|  | Formulation 3.1.1 Control | Formulation 3.1.2 Trial |
|---|---|---|
| Alpha Hemihydrate | 1500.00 | 1400.00 |
| Beta Hemihydrate | 0 | 0 |
| Calcium Carbonate | 950.00 | 1050.00 |
| Perlite | 175.00 | 175.00 |
| Attapulgite | 150.00 | 150.00 |
| Polyvinyl Alcohol | 11.00 | 11.00 |
| Starch | 31.00 | 31.00 |
| Cellulose | 10.00 | 8.00 |
| Accelerator | 3.00 | 3.00 |
| Retarder | 1.50 | 1.50 |

TABLE 8

Example inventive setting-type joint compound formulation 3.2.2 displaying improved sandability over a comparable control lightweight formulation with > 50 wt % hemihydrate formulation 3.2.1. All weights in this table are in grams.

|  | Formulation 3.2.1 Control | Formulation 3.2.2 Trial |
|---|---|---|
| Alpha-Hemihydrate | 1350.00 | 1350.00 |
| Beta-Hemihydrate | 100.00 | 0 |
| Calcium Carbonate | 950.00 | 1050.00 |
| Perlite | 170.00 | 170.00 |
| Attapulgite | 100.00 | 100.00 |
| Polyvinyl Alcohol | 11.50 | 11.50 |
| Starch | 9.50 | 9.50 |
| Cellulosic Thickener | 8.00 | 8.00 |
| Accelerator | 5.00 | 5.00 |
| Retarder Mix | 3.00 | 3.00 |

TABLE 9

Example 3.1. Sanding Ease (150 grit, 5 passes)

|  | Formulation 3.1.1 Control 52.9 wt. % Hemihydrate | Formulation 3.1.2 Trial 49.5 wt. % Hemihydrate |
|---|---|---|
| Avg. Mass Removed (%), N = 3 | 4.4% | 6.9% |

TABLE 10

Example 3.2. Sanding Ease (150 grit, 5 passes)

|  | Formulation 3.2.1 Control 53.1 wt. % Hemihydrate | Formulation 3.2.2 Trial 49.4 wt. % Hemihydrate |
|---|---|---|
| Avg. Mass Removed (%), N = 3 | 4.5% | 5.7% |

The setting-type joint compounds were evaluated for sandability using a device and procedure described by Pelot et al. in U.S. Patent Application Pub. No. US2017/0241881A1 incorporated herein by reference, but with certain modifications. The setting-type joint compounds were sanded on a tabletop device applying a reproducible force along an axis utilizing 150-grit sandpaper and having an oscillating sanding member arm weight of 5.5 lbs. The joint compound sample that was sanded was 7.5 inches in length and 2 inches in width. The oscillating sanding member completed five cycles and the weight after sanding was compared to its initial weight before sanding.

As shown in Table 9 with the control and inventive formulations 3.1.1 and 3.1.2, respectively, decreasing the total hemihydrate amount from 52.9 wt % to 49.5 wt % enhanced the sanding ease significantly, allowing 2.5 wt % more material to be removed by sanding after five passes with 150-grit sandpaper.

As shown in Table 10, decreasing the total hemihydrate amount from 53.1 wt % to 49.4 wt % enhanced the sanding ease significantly, allowing 1.2 wt % more material from formulation 3.2.2 to be removed by sanding after five passes with 150-grit sandpaper compared with the control sample.

Example 4. Embodiments of Setting-Type Joint Compounds with Reduced Calcium Sulfate Hemihydrate Exhibiting Adjacency in Compressive Strength to a Comparable Setting-Type Joint Compound with >50 wt % Calcium Sulfate Hemihydrate

TABLE 11

Setting-type joint compound formulas used to demonstrate differences in dry compressive strength. All weights in this table are in grams.

|  | Formula 4.1 Control | Formula 4.2 Trial |
|---|---|---|
| Alpha Hemihydrate | 682.5 | 562.5 |
| Beta Hemihydrate | 682.5 | 562.5 |
| Calcium carbonate | 760 | 1000 |
| Perlite | 146 | 146 |
| Attapulgite | 100 | 100 |
| Starch | 26.5 | 26.5 |
| Polyvinyl alcohol | 9.5 | 9.5 |
| Cellulosic thickener | 8.4 | 8.4 |
| Accelerator | 1 | 1 |
| Retarder | 2 | 2 |
| Total Weight | 2418.4 | 2418.4 |

TABLE 12

2 inch Cube Dry Densities and Compressive Strengths of the Example Setting-Type Joint Compound Formulations

|  | Formula 4.1 Control | Formula 4.2 Trial |
|---|---|---|
| 2" Cube Dry density (PCF) | | |
| 1 | 54.99 | 53.88 |
| 2 | 55.47 | 53.91 |
| 3 | 54.73 | 54.15 |
| Average | 55.06 | 53.98 |
| 2" Cube Compressive Strength (psi) | | |
| 1 | 1629.87 | 1290.15 |
| 2 | 1580.06 | 1315.54 |
| 3 | 1489.52 | 1367.63 |
| Average | 1566.48 | 1324.44 |

The setting-type joint compounds were prepared by mixing the raw materials with water as shown in Table 11 to demonstrate adjacency in dry compressive strength of the inventive composition when measured against a comparable lightweight setting-type joint compound (control with >50 wt % hemihydrate).

In Table 12, compressive strength was measured in psi on dried 2-inch cubes according to ASTM C-472.

Compressive strength of calcium sulfate dihydrate is related to the cube of the density. The data shows that the two setting-type joint compounds with 56.44 wt % and 46.52 wt % hemihydrate levels, have compressive strengths within 300 psi of each other with their densities 1.08 PCF apart despite significantly less hemihydrate in the latter sample. The 56.44 wt % formulation is slightly denser and has a slightly higher compressive strength. If one normalized it on the basis of density, then the lower plaster formulation would have a predicted compressive strength of $1324.44*(55.06/53.98)^3=1405.537$ psi at 55.06 PCF.

Example 5. Further Embodiments of Setting-Type Joint Compound with Reduced Calcium Sulfate Hemihydrate Exhibiting Enhanced Snap-Setting Behavior

TABLE 13

Example setting-type joint compound formulas to evaluate snap-setting behavior

|  | 1567A Control | 1567B Trial 1 | 1567C Trial 2 |
|---|---|---|---|
| Alpha Hemihydrate | 682.5 | 500 | 350 |
| Beta hemihydrate | 682.5 | 500 | 350 |
| Calcium carbonate | 760 | 1125 | 1425 |
| Perlite | 146 | 146 | 146 |
| Attapulgite | 100 | 100 | 100 |
| Starch | 26.5 | 26.5 | 26.5 |
| Polyvinyl alcohol | 9.5 | 9.5 | 9.5 |
| Cellulosic thickener | 8.4 | 8.4 | 8.4 |
| Accelerator | 1 | 1 | 1 |
| Retarder | 2 | 2 | 2 |
| Total Weight | 2418.4 | 2418.4 | 2418.4 |

The setting-type joint compounds were prepared by mixing the raw materials with water as shown in Table 13. The consistencies for 1567A, B, and C, were 62.5, 62.0, and 60.3 cc, respectively.

Figure 5:
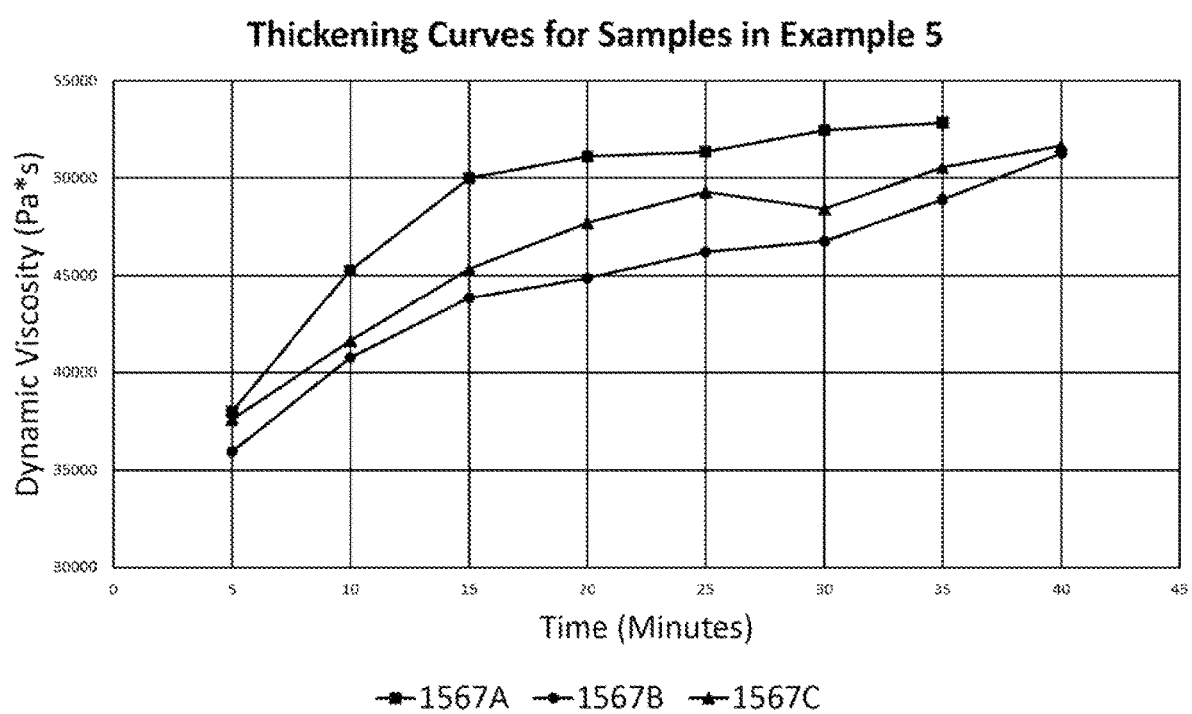
FIG. 5 depicts thickening curves for setting-type joint compound compositions as disclosed in Example 5 herein.

The thickening curve for each of the samples was plotted as a function of the dynamic viscosity versus time. These thickening curves are shown in FIG. 5. The dynamic viscosity has been converted to the SI unit of Pascal-seconds (Pa·s) in the figure.

Vicat Set Time was measured in minutes according to modified ASTM C-472 (Standard Test Methods for Physical Testing of Gypsum, Gypsum Plasters and Gypsum Concrete, ASTM International, West Conshohocken, Pa., 2014). The Vicat set time was started at the time water was added to the dry mixture of the setting-type joint compound. Each sample was scooped into a cup at the use viscosity. A 300-gram Vicat needle was held above the center, perpendicular to the surface of the joint compound. The needle was held to the surface and released to fall freely of its own weight. The Set time was determined when the needle failed to penetrate halfway into the joint compound surface.

Thickening curves of the formulations with the reduced plaster have a diminished rise in dynamic viscosity during the setting compounds' working time. The dynamic viscosity is plotted until a maximum torque on the viscometer is reached. The Vicat sets of the three formulations are 51, 53, and 53 min, respectively. The lower hemihydrate formulas (48.59 wt % and 46.52 wt %, respectively, for 15678 and 15670 trial formulas) have lower viscosities and do not reach maximum torque as rapidly as the 1567A control with over 50 wt % calcium sulfate hemihydrate despite the proximity of their Vicat sets.

What is claimed is:

1. A dry-powder setting-type joint compound, the setting-type joint compound comprising:
   calcium sulfate hemihydrate in an amount from 28 wt % to 50 wt %;
   calcium carbonate in an amount such that the total amount of calcium sulfate hemihydrate and calcium carbonate is 80 wt % to 95 wt %;
   a starch binder;
   a redispersible latex binder;
   one or more of kaolin clay, sepiolite, bentonite, montmorillonite clay, attapulgite clay, or any mixture thereof;
   a rheological modifier;
   a cellulosic thickener;
   a set retarder; and
   a set accelerator.

2. The dry-powder setting-type joint compound of claim 1, wherein calcium sulfate hemihydrate is in the amount from 34 wt % to 46 wt %.

3. The dry-powder setting-type joint compound of claim 1, wherein calcium sulfate hemihydrate does not comprise beta calcium sulfate hemihydrate.

4. The dry-powder setting-type joint compound of claim 1, wherein calcium sulfate hemihydrate does not comprise alpha calcium sulfate hemihydrate.

5. The dry-powder setting-type joint compound of claim 1, wherein the redispersible latex binder includes one or more of the following: vinyl acetate ethylene (VAE) copolymers, vinyl acetate/vinyl ester of versatic acid (VAE-VeoVa) copolymers, styrene butadiene, acrylic powder, polyvinyl alcohol, or any combination thereof.

6. The dry-powder setting-type joint compound of claim 1, wherein the starch binder is pregelatinized.

7. The dry-powder setting-type joint compound of claim 1, wherein the setting-type joint compound further comprises one or more of the following: perlite, resin microspheres, hollow microspheres, or any combination thereof.

8. The dry-powder setting-type joint compound of claim 1, wherein the setting-type joint compound comprises from 5 wt % to 20 wt % of expanded perlite.

9. The dry-powder setting-type joint compound of claim 1, wherein the setting-type joint compound comprises 0.01 wt % to 5 wt % of attapulgite clay.

10. The dry-powder setting-type joint compound of claim 1, wherein the rheological modifier is a substituted starch.

* * * * *